(12) United States Patent
Deferme et al.

(10) Patent No.: US 11,719,305 B2
(45) Date of Patent: Aug. 8, 2023

(54) BALANCED CONTINUOUSLY SEMI-ACTIVE DAMPER

(71) Applicant: DRiV Automotive Inc., Lake Forest, IL (US)

(72) Inventors: Stefan Deferme, Heusden-Zolder (BE); Daniel Keil, Temperance, MI (US)

(73) Assignee: DRiV Automotive Inc., Southfield, MI (US)

( * ) Notice: Subject to any disclaimer, the term of this patent is extended or adjusted under 35 U.S.C. 154(b) by 140 days.

(21) Appl. No.: 16/678,294

(22) Filed: Nov. 8, 2019

(65) Prior Publication Data

US 2021/0140505 A1 May 13, 2021

(51) Int. Cl.
*F16F 9/32* (2006.01)
*F16F 9/06* (2006.01)
(Continued)

(52) U.S. Cl.
CPC .............. *F16F 9/325* (2013.01); *F16F 9/062* (2013.01); *F16F 9/34* (2013.01); *F16F 9/46* (2013.01); *F16F 9/50* (2013.01)

(58) Field of Classification Search
CPC .. F16F 9/325; F16F 9/34; F16F 9/3405; F16F 9/348; F16F 9/3482; F16F 9/5126;
(Continued)

(56) References Cited

U.S. PATENT DOCUMENTS 5,180,039 A * 1/1993 Axthammer ........ F16K 31/0655
188/315
5,375,683 A * 12/1994 Huang ...................... F16F 9/46
188/266.8
(Continued)

FOREIGN PATENT DOCUMENTS

| CN | 108087481 A | * | 5/2018 | | |
|---|---|---|---|---|---|
| DE | 4041829 A1 | * | 7/1992 | .............. | F16F 9/325 |
| DE | 4406350 A1 | * | 9/1995 | .............. | F16F 9/325 |
| DE | 19841857 A1 | * | 6/1999 | ................ | F16F 9/18 |
| DE | 102013218658 A1 | * | 3/2015 | ................ | F16F 9/34 |
| DE | 102016206595 A1 | | 10/2017 | | |

(Continued)

OTHER PUBLICATIONS

Notification of Transmittal, International Search Report and Written Opinion of International Search Authority dated Mar. 4, 2021 regarding International Application No. PCT/US2020/059360 (13 pages).

*Primary Examiner* — Nicholas J Lane
*Assistant Examiner* — Stephen M Bowes
(74) *Attorney, Agent, or Firm* — DRiV Automotive Inc,

(57) ABSTRACT

A continuously variable damper is disclosed. The damper includes an elongate outer tube and inner tube with a piston in the inner tube. The piston defines a rebound working chamber and compression working chamber. An active rebound valve is in fluid communication with the rebound working chamber through a rebound down tube, and an active compression valve is in fluid communication with the compression working chamber through a compression down tube. An intake compression valve is in fluid communication with the rebound working chamber through the rebound down tube, and an intake rebound valve is in fluid communication with the compression working chamber through the compression down tube. The opposite position of the intake valves balance the active rebound and compression valves to avoid asymmetric/bending loads on the inner tube in the damper.

20 Claims, 3 Drawing Sheets

(51) Int. Cl.
*F16F 9/34* (2006.01)
*F16F 9/46* (2006.01)
*F16F 9/50* (2006.01)

(58) Field of Classification Search
CPC .......... F16F 9/3484; F16F 9/062; F16F 9/187;
F16F 9/466; F16F 9/46; F16F 9/50
See application file for complete search history.

(56) References Cited

U.S. PATENT DOCUMENTS

| | | | |
|---|---|---|---|
| 6,321,888 B1 | 11/2001 | Reybrouck et al. | |
| 2006/0108190 A1* | 5/2006 | Forster | F16F 9/512 |
| | | | 188/318 |
| 2015/0047937 A1* | 2/2015 | Kim | F16F 9/461 |
| | | | 188/322.13 |
| 2015/0076376 A1* | 3/2015 | Manger | F16F 9/3405 |
| | | | 251/54 |
| 2018/0209505 A1* | 7/2018 | Schmidt | B60G 17/08 |
| 2018/0355940 A1* | 12/2018 | Manger | F16F 9/325 |
| 2019/0136932 A1 | 5/2019 | Deferme | |
| 2021/0115996 A1* | 4/2021 | Ruhmann | F16F 9/466 |

FOREIGN PATENT DOCUMENTS

| | | | |
|---|---|---|---|
| EP | 1862337 B1 | 8/2012 | |
| EP | 2746616 A2 | 6/2014 | |
| GB | 2378231 B | 3/2003 | |
| KR | 101756423 B1 | 7/2017 | |
| WO | 2019057394 A1 | 3/2019 | |

* cited by examiner

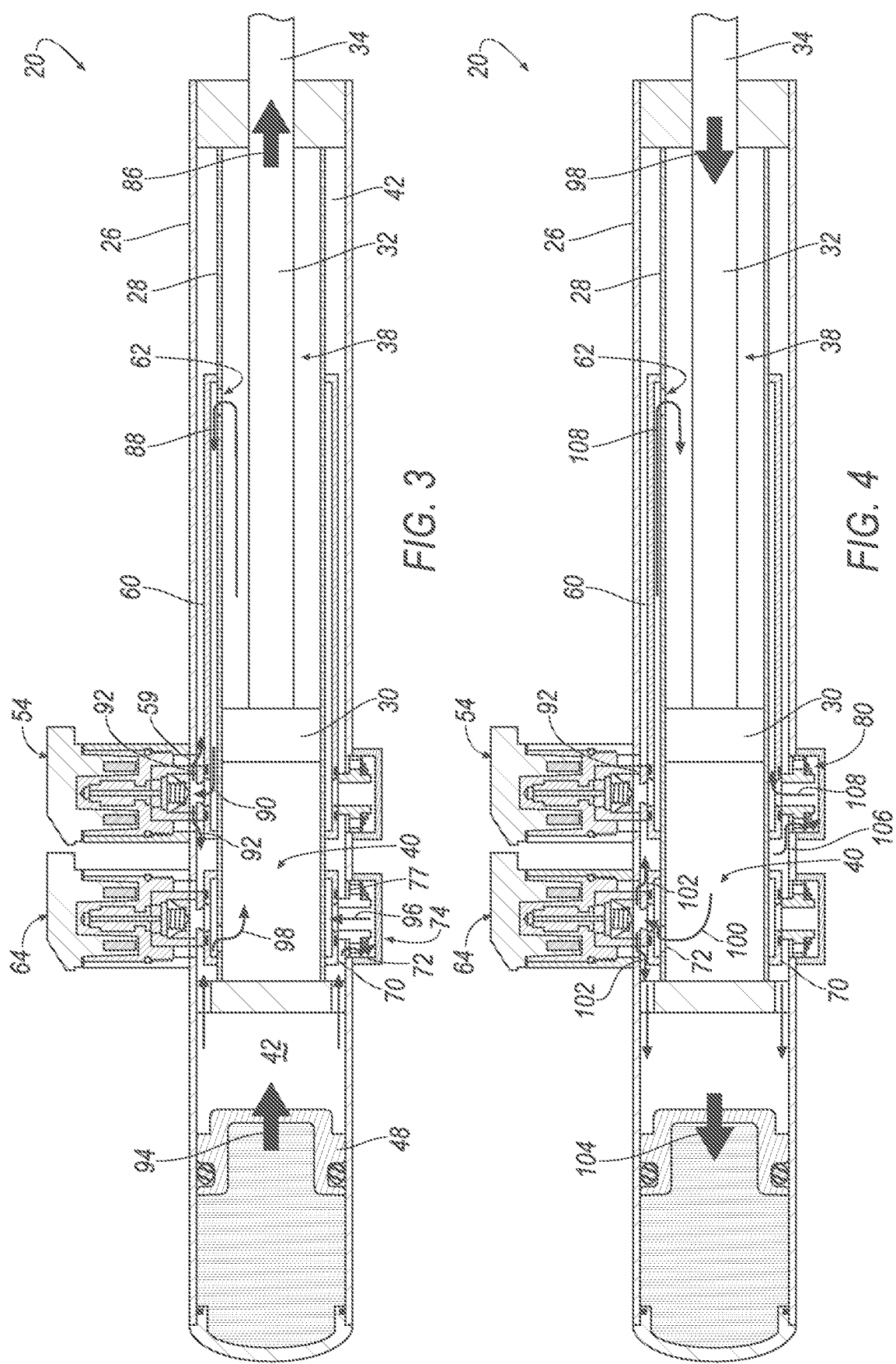

BALANCED CONTINUOUSLY SEMI-ACTIVE DAMPER

FIELD

The present disclosure generally relates to dampers. More particularly, the present disclosure relates to a damper with external active control valves which are balanced with passive intake valves.

BACKGROUND

Dampers for vehicles are commonly included in a wide variety of vehicle segments. Some vehicles include semi-active damping that adjusts damping levels according to road conditions and vehicle dynamics. The dampers are between a body and the suspension system of the vehicle. A piston is located within the damper. The piston is connected to the vehicle body or the suspension of the vehicle through a piston rod. As the damper is compressed or extended, fluid flows between rebound and compression chambers within the damper to counteract vibrations. By adjusting the flow of damping fluid between the chambers, greater or lower damping forces may be generated.

A need has arisen to provide an improved damper.

BRIEF DESCRIPTION OF THE DRAWINGS

FIG. 3 is a plan view of a variable damper according to an example of the disclosure illustrating a rebound flow path.

FIG. 4 is a plan view of a variable damper according to an example of the disclosure illustrating a compression flow path.

DETAILED DESCRIPTION

Figure 1:
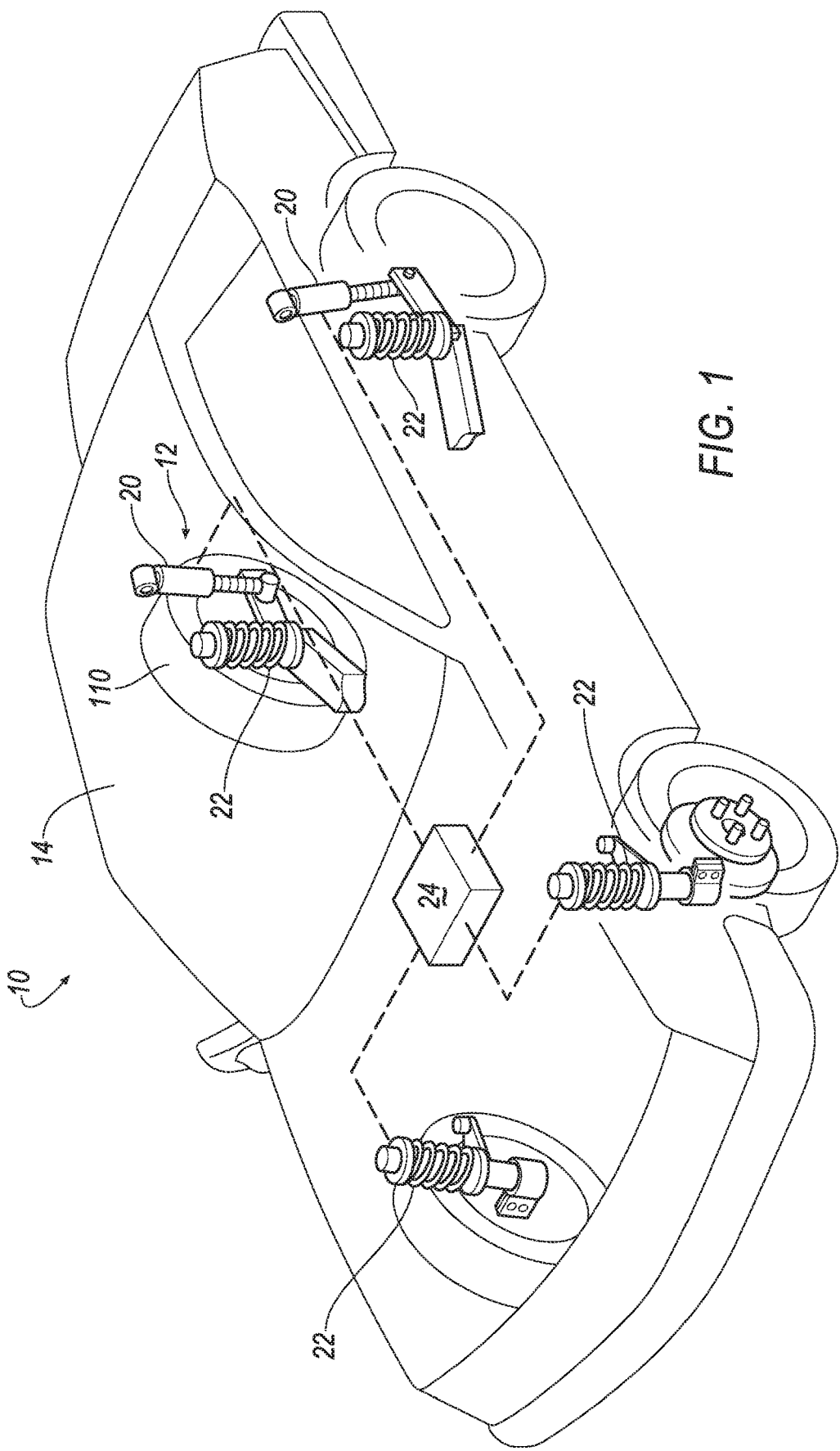
FIG. 1 is a schematic illustration of a vehicle incorporating a suspension system according to an example of the disclosure.

The present disclosure relates to a damping system that continuously adjusts damping levels according to road conditions and vehicle dynamics. With reference to FIG. 1 there is shown a vehicle 10 having a suspension system 12 and a body 14. Suspension system 12 includes dampers 20 and coil springs 22. Dampers 20 are semi-active with damping levels controlled by an Electronic Control Unit (ECU) 24. ECU 24 receives information (acceleration, displacement, steering, braking, speed) from sensors (not shown) at various locations on the vehicle to make independent adjustments to each damper.

Figure 2:
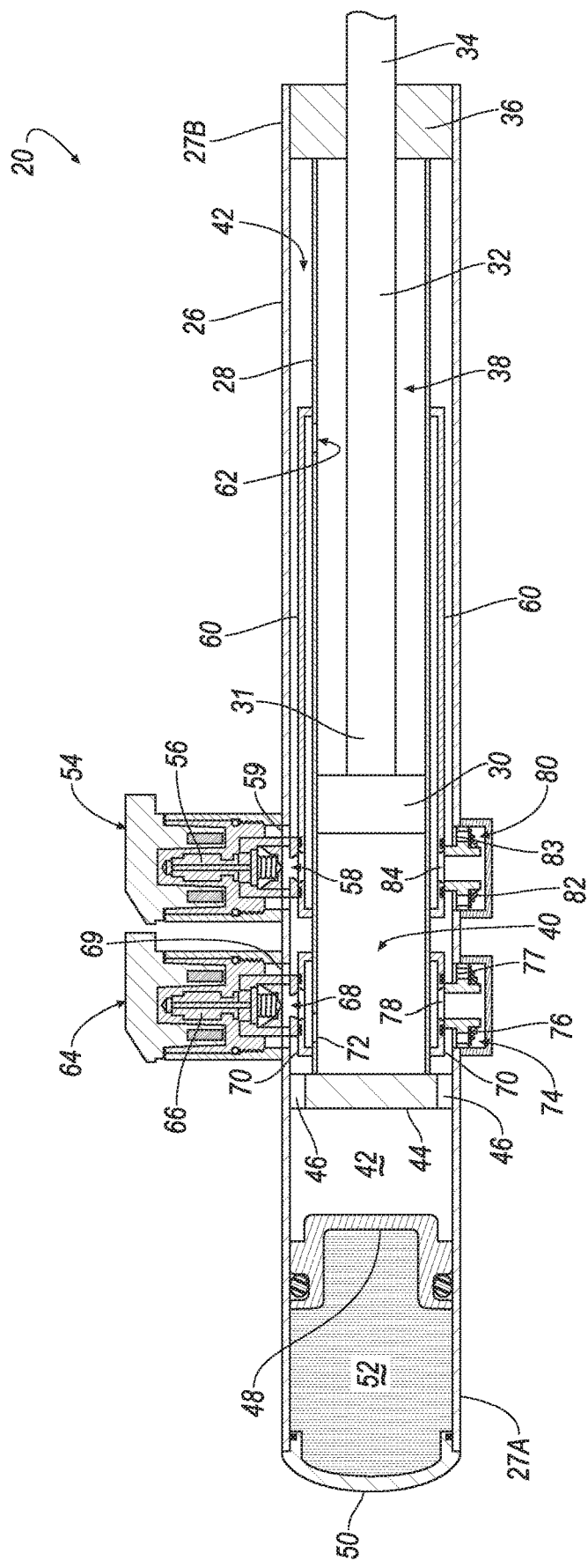
FIG. 2 is a plan view of a variable damper according to an example of the disclosure.

With reference to FIG. 2 the exemplary disclosure provides a continuously variable damper 20 that includes an elongate outer tube 26 having a first end 27A and a second end 27B. Outer tube 26 has an inner tube 28 concentrically contained therein. A rod 32 including a piston 30 at a first rod end 31 is contained within inner tube 28 and rod 32 includes a second end 34 extending externally of elongate outer tube 26 through a rod guide assembly 36. As shown piston 30 and inner tube 28 define a rebound working chamber 38 and compression working chamber 40. Rebound working chamber 38 and compression chamber 40 containing a fluid, preferably a hydraulic oil suitable for use with dampers.

Damper 20 includes an active rebound valve 54 in fluid communication with rebound working chamber 38 through a rebound down tube 60. Active rebound valve 54 has a variable flow resistance. Damper 20 also includes an active compression valve 64 that is in fluid communication with compression working chamber 40 through a compression down tube 70. Active compression valve 64 has a variable flow resistance. An intake compression valve 80 is provided that is in fluid communication with rebound working chamber 38 through rebound down tube 60 such that the fluid flows through active compression valve 64 and intake compression valve 80 when second rod end 34 moves toward the rod guide 36 (i.e. during compression stroke). Damper 20 also includes an intake rebound valve 74 that is in fluid communication with compression working chamber 40 through compression down tube 70 where fluid flows through active rebound valve 54 and intake rebound valve 74 when second rod end 34 moves away from rod guide 36.

As shown in the Figures, active rebound valve 54 and active compression valve 64 are orthogonally oriented to the long axis of the elongate tube 26. During compression stroke, as the second rod end 34 moves toward the rod guide 36, fluid flows through both active compression valve 64, located on one side of the elongate tube 26, and intake compression valve 80, located on the opposite side of the elongate tube 26, substantially balancing out a bending moment on the elongate tube 26. Similarly, during rebound stroke, as the second rod end 34 moves away from rod guide 36, fluid flows through both active rebound valve 54, located on one side of the elongate tube 26, and intake rebound valve 74, located on the opposite side of the elongate tube 26, substantially balancing out a bending moment on the elongate tube 26. The opposite position of the intake valves balance the active rebound and compression valves which avoids asymmetric loads, namely bending, on inner tube 28 in damper 20. Reduction in the bending moment allows for a comparatively smaller continuously semi-active damper for any given load as compared to continuously semi-active dampers without the inclusion of intake rebound valves and intake compression valves because the wall thicknesses of the outer tubes and inner tubes do not need to be thick enough to resist both compressive load and a bending moment. The ability to provide smaller dampers may be particularly useful for use with electric vehicles or to address space and packaging challenges.

As illustrated in the disclosed example active rebound valve 54 has an active rebound inlet passage 58 which defines an active rebound contact area, and intake rebound valve 74 includes an outlet 78 which defines an intake rebound contact area. The term contact area describes the two-dimensional area of the outlet. As shown the contact areas are substantially identical to further reduce the bending moment. Likewise active compression valve 64 includes an inlet passage 68 that defines a compression contact area and intake compression valve 80 includes an outlet passage 84 that defines a contact area that can be substantially identical to the contact area of the active compression intake passage 68. As shown in the Figures active rebound valve 54 may be substantially 180 degrees offset from intake rebound valve 74 and active compression valve 64 may be substantially 180 degrees offset from intake compression valve 80 to further balance fluid flows and substantially eliminate bending moments.

With reference to FIG. 2, damper 20 includes elongate outer tube 26. Inner tube 28 is concentrically positioned within outer tube 26. At one end inner tube 28 is affixed to rod guide assembly 36 and at another end inner tube 28 is affixed to a cylinder end 44. As illustrated the length of outer tube 26 is greater than the length of inner tube 28. Outer tube 26 extends past inner tube 28 and includes a damper end 50. A floating piston 48 is positioned between damper end 50 and cylinder end 44 to define a gas chamber 52 and a low pressure chamber 42. Gas chamber 52 is filled with an appropriate gas, for example nitrogen. Low pressure chamber 42 extends to a space between outer tube 26 and inner tube 28. Floating piston 48 moves during operation such that the gas in gas chamber 52 is compressed to maintain proper volume for the fluid in the damper. Low pressure chamber 42 includes the fluid, for example oil, which typically is hydraulic oil. Low pressure chamber 42 extends between inner tube 28 and outer tube 26 through passages 46 in cylinder end 44. In an example, cylinder end 44 includes at least two passages 46.

Rod 32 is received within inner tube 28. Rod 32 passes externally of damper 20 through rod guide assembly 36 such that rod end 34 is external of damper 20. Piston 30 is attached to rod end 31 within inner tube 28. Piston 30 defines rebound working chamber 38 and compression working chamber 40. Rebound working chamber 38 and compression working chamber 40 are filled with the same oil as low pressure chamber 42 and the manner in which fluid flows between low pressure chamber 42, rebound pressure chamber 38 and compression working chamber 40 is described in greater details below.

Damper 20 is variable meaning the damping level can adjust based on conditions. Variable damping is provided using active rebound valve 54 and active compression valve 64. Each of active rebound valve 54 and active compression valve 64 are one-way valves. Active rebound valve 54 includes a rebound solenoid 56 which is a controllable valve operably connected to ECU 24. Similarly, active compression valve 64 includes a solenoid valve 66 also operably connected to ECU 24. Solenoid valves 56 and 66 may be electro hydraulic valves. ECU 24 receives information (acceleration, displacement, steering, braking, speed) from sensors (not shown) at various locations on the vehicle to make independent adjustments to each damper to change the damping rate to adapt to road conditions. For example the ECU may cause the solenoid valves 56, 66 to restrict fluid flow through damper 20 to provide a harder ride or provide less restriction to provide a softer ride.

Active rebound valve 54 is in fluid communication with rebound working chamber 38 through an active rebound valve inlet passage 58 and with low pressure chamber 42 through an active rebound outlet passage 59. The active rebound inlet passage 58 is fed through rebound down tube 60 and an inner rebound tube passage 62. Rebound down tube 60 is a sealed tube that defines a flow path from rebound working chamber 38 through inner rebound tube passage 62 and into rebound inlet passage 58. The active rebound inlet passage 58 defines a contact area which represents the two-dimensional area of passage 58. Rebound down tube 60 is positioned between outer tube 26 and inner tube 28 and extends to allow fluid to flow through active rebound valve 54 and rebound working chamber 38.

Active compression valve 64 is in fluid communication with compression working chamber 40 through an active compression valve inlet passage 68 and with low pressure chamber 42 through an active compression valve outlet passage 69. The active compression valve inlet passage 69 is fed through compression down tube 70 and an inner compression down tube passage 72. The active compression passage 68 defines a contact area which represents the two-dimensional area of passage 68. Compression down tube 70 is also positioned between outer tube 26 and inner tube 28. Compression down tube 70 is a sealed tube that defines a flow path from rebound working chamber 40 into active compression valve 64 through compression inner tube passage 72 and further defines a fluid passage from rebound intake valve outlet 78 circumferentially around inner tube 28 and into compression working chamber 40 through compression inner tube passage 72.

As shown, damper 20 also includes rebound intake valve 74 which is a passive one-way valve. Rebound intake valve 74 includes a biasing element, for example a spring 76 and an associated rebound intake valve passage inlet 77 and intake valve outlet passage 78. Rebound valve inlet passage 77 receives fluid from low pressure chamber 42 and rebound outlet valve passage 78 outputs fluid into compression working chamber 40 by passing fluid through compression down tube 70 circumferentially to compression inner tube passage 72.

Damper 20 further includes compression intake valve 80 which is a passive one-way valve. Compression intake valve 80 includes a biasing element, for example a spring 82 and an associated compression intake valve outlet passage 84 and intake valve inlet passage 83. Compression valve inlet passage 83 receives fluid from low pressure chamber 42 and outputs the fluid into the rebound working chamber 38 through a compression valve outlet passage via rebound down tube 60 and rebound inner tube passage 62.

With reference to FIG. 3 there is shown a flow path for a rebound cycle. In a rebound cycle rod 32 and piston 30 extend away from damper 20 as indicated by arrow 86. Fluid is forced from rebound working chamber 38 through rebound inner passage 62 through rebound down tube 60 into active rebound valve inlet passage 58 as shown by arrows 88 and 90. Fluid then flows through active rebound valve 54. The resistance of fluid flow through active rebound valve 54 is controlled by ECU 24. The fluid will pass through active rebound valve 54 and out into the low pressure chamber 42 via the active rebound outlet passage 59 as illustrated by arrows 92. As rod 32 and piston 30 move away from damper as shown by arrow 86 floating piston 48 moves in the same direction as shown by arrow 94. As floating piston 48 moves in the direction of arrow 94 fluid flows from low pressure chamber 42 through passages 46 and into rebound intake valve inlet passage 77. Fluid then flows through the rebound intake valve 74 and into the compression working chamber 40 via rebound intake valve outlet passage 78 through compression down tube 70 and out compression inner tube passage 72 as shown by arrows 96 and 98.

As shown the rebound intake outlet passage 78 has substantially the same contact area as the active rebound valve inlet passage 58, and the rebound intake valve 74 is substantially 180 degrees offset from the active rebound valve 54 in order to balance the forces of fluid flowing orthogonally to the direction of arrow 86 in order to substantially eliminate bending moments on damper 20. As described fluid flows between rebound working chamber 38 and compression working chamber 40 to provide damping.

With reference to FIG. 4 there is shown a flow path for a compression cycle. In a compression cycle rod 32 and piston 30 extend toward damper 20 as indicated by arrow 98. Fluid is forced from compression working chamber 40 through compression inner tube passage 72 through compression down tube 70 into active compression valve inlet passage 68 as show by arrow 100. Fluid then flows through active compression valve 64. The resistance of fluid flow through active compression valve 64 is controlled by ECU 24. The fluid will pass through active compression valve 64 and out into the low pressure chamber 42 via the active compression outlet passage 69 as illustrated by arrows 102. As shown the flow from active compression valve 64 passes through passages 46 which moves floating piston in the direction indicated by arrow 104. As rod 32 and piston 30 move toward damper 20, as shown by arrow 98, and fluid is forced into active compression valve 54 it is also forced into inlet 83 of compression intake valve 80 as shown by arrow 106. As shown by arrows 108 fluid is forced through compression intake valve 80 and through rebound down tube 60, through inner tube rebound passage 62 and into rebound working chamber 28 as shown by arrows 108.

As shown the rebound intake outlet passage 84 has substantially the same contact area as the active compression valve inlet passage 68, and the compression intake valve 80 is substantially 180 degrees offset from the active compression valve 64 in order to balance the forces of fluid flowing orthogonally to the direction of arrow 94 in order to substantially eliminate bending moments on damper 20.

By providing a combination of active and passive valves fluid flows through the damper in an improved force balanced way. By balancing the fluid forces associated with the active rebound valve and active compression valve with passive rebound and compression intake valves the present disclosure enables semi-active damping systems having orthogonal active valves to have decreased dimensions allowing for a wider range of potential uses for such systems.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A continuously variable damper comprising:
    an elongate outer tube having a first end and a second end and having an inner tube concentrically contained therein;
    a rod having a piston on a first rod end and a second rod end extending externally of the elongate outer tube through a rod guide, the piston and the inner tube defining a rebound working chamber and a compression working chamber, the rebound and working compression chambers containing a fluid;
    an active rebound valve in fluid communication with the rebound working chamber through a rebound down tube, the rebound down tube concentrically contained between the elongate outer tube and the inner tube, the active rebound valve having a variable flow resistance;
    an active compression valve in fluid communication with the compression working chamber through a compression down tube, the active compression valve having a variable flow resistance;
    an intake compression valve in fluid communication with the rebound working chamber through the rebound down tube, wherein the fluid flows through the active compression valve and intake compression valve when the second rod end moves toward the rod guide; and
    an intake rebound valve in fluid communication with the compression working chamber through the compression down tube, wherein fluid flows through the active rebound valve and intake rebound valve when the second rod end moves away from the rod guide;
    wherein the elongate outer tube is between the intake compression valve and the active rebound valve along an axis that is perpendicular to elongation of the elongate outer tube.

2. The continuously variable damper of claim 1 wherein the active rebound valve has an active rebound contact area that is an area of an active rebound valve inlet passage, and the intake rebound valve has an intake rebound contact area that is an area of a rebound intake outlet passage, the intake rebound contact area substantially identical to the active rebound contact area.

3. The continuously variable damper of claim 1 wherein the intake rebound valve is displaced from the active rebound valve by substantially 180 degrees circumferentially about the elongate outer tube, and wherein the elongate outer tube is between the intake rebound valve and the active compression valve along the axis that is perpendicular to elongation of the elongate outer tube.

4. The continuously variable damper of claim 1 further comprising a floating piston that defines a gas chamber proximate the first end of the elongate outer tube.

5. The continuously variable damper of claim 4 further comprising a cylinder end, the compression down tube cylinder end and the floating piston separated to create a low-pressure chamber, the low-pressure chamber containing the fluid.

6. The continuously variable damper of claim 5 where the cylinder end includes at least two passages.

7. The continuously variable damper of claim 6 where the low-pressure chamber extends to a space between the inner and outer cylinders via the passages in the down tube cylinder end.

8. The continuously variable damper of claim 1 wherein the active rebound valve includes a first solenoid and the active compression valve includes a second solenoid.

9. The continuously variable damper of claim 8 wherein the intake compression valve and the intake rebound valves are passive.

10. The continuously variable damper of claim 1, further comprising an inner rebound tube passage at the inner tube and a rebound inlet passage at the active rebound valve, the inner rebound tube passage axially spaced from the rebound inlet passage, and the rebound down tube defining a flow path from the rebound working chamber through the inner rebound tube passage and into the rebound inlet passage.

11. A continuously variable damper comprising:
    an elongate outer tube having a first end and a second end and having an inner tube concentrically contained therein, the inner tube having a first end and a second end, the first end of the inner tube terminating at a rod guide and the second end terminating at a cylinder end, such that a low pressure chamber is defined between the cylinder end and the second end of the outer tube and between the inner tube and the outer tube;
    a rod having a piston on a first rod end and a second rod end extending externally of the elongate outer tube through the rod guide, the piston and inner tube defining a rebound working chamber between the piston and rod guide and the piston and the inner tube defining a compression working chamber between the piston and the cylinder end;
    an active rebound valve in fluid communication with the rebound working chamber through a rebound down tube, the active rebound valve having a variable flow resistance controllable by an ECU;
    an active compression valve in fluid communication with the compression working chamber through a compression down tube, the active compression valve having a variable flow resistance controllable by an ECU;

an intake compression valve in fluid communication with the rebound working chamber through the rebound down tube, wherein the fluid flows through the active compression valve and intake compression valve when the second rod end moves toward the rod guide assembly; and an intake rebound valve in fluid communication with the compression working chamber through the compression down tube, wherein fluid flows through the active rebound valve and intake rebound valve when the second rod end moves away from the rod guide assembly, the intake rebound valve displaced from the active rebound valve by substantially 180 degrees circumferentially about the elongate outer tube;

wherein the elongate outer tube is between the intake compression valve and the active rebound valve along an axis that is perpendicular to elongation of the elongate outer tube.

12. The continuously variable damper as in claim 11 further comprising a floating piston, the floating piston creating a gas chamber between the floating piston and the second end of the outer tube, wherein the low-pressure chamber is defined between the cylinder end and the floating piston and between the inner tube and the outer tube.

13. The continuously variable damper as in claim 12 wherein the active rebound valve has an active rebound contact area that is an area of an active rebound valve inlet passage, and the intake rebound valve has an intake rebound contact area that is an area of a rebound intake outlet passage, the intake rebound contact area substantially identical to the active rebound contact area.

14. The continuously variable damper of claim 11 wherein the active rebound valve includes a first solenoid and the active compression valve includes a second solenoid.

15. The continuously variable damper of claim 14 wherein the intake compression valve and the intake rebound valves are passive.

16. The continuously variable damper of claim 11 wherein the active rebound valve is a electro-hydraulic valve.

17. The continuously variable damper of claim 11, wherein the rebound down tube surrounds the inner tube within the elongate outer tube.

18. The continuously variable damper of claim 11, wherein the rebound down tube is elongated parallel to the elongate outer tube.

19. The continuously variable damper of claim 11, wherein the elongate outer tube encloses a pressure chamber, and the rebound down tube is fully disposed within the pressure chamber.

20. The continuously variable damper of claim 11, wherein the elongate outer tube is between the intake rebound valve and the active rebound valve along the axis that is perpendicular to elongation of the elongate outer tube.

* * * * *